United States Patent [19]

Iles

[11] Patent Number: 4,754,274
[45] Date of Patent: Jun. 28, 1988

[54] MICROPROCESSOR INTERFACE DEVICE FOR USE IN A TELECOMMUNICATIONS SYSTEM

[75] Inventor: Richard P. A. Iles, Dorset, England

[73] Assignee: Plessey Overseas Limited, Ilford, England

[21] Appl. No.: 802,403

[22] Filed: Nov. 27, 1985

[30] Foreign Application Priority Data

Nov. 28, 1984 [GB] United Kingdom ............. 8430004

[51] Int. Cl.⁴ .................... H04Q 5/00; H04Q 11/00; H04J 3/02
[52] U.S. Cl. .................... 340/825.5; 370/85; 364/200; 140379/184
[58] Field of Search .............. 340/825.5, 825.51; 364/200 MS File, 900 MS File; 370/85; 379/161, 184

[56] References Cited

U.S. PATENT DOCUMENTS

| | | | |
|---|---|---|---|
| 4,339,633 | 7/1982 | Ahmed | 370/85 |
| 4,453,214 | 6/1984 | Adcock | 364/200 |
| 4,543,628 | 9/1985 | Pomfret | 364/200 |
| 4,586,128 | 4/1986 | De Woskin | 340/825.5 |

FOREIGN PATENT DOCUMENTS

84/04833 12/1984 PCT Int'l Appl.
2134753 8/1984 United Kingdom.

Primary Examiner—Robert L. Griffin
Assistant Examiner—Ralph E. Smith
Attorney, Agent, or Firm—Michael F. Oglo; Julian C. Renfro

[57] ABSTRACT

The microprocessor interface device is for use in a telecomminications system including a microprocessor. The device includes a first interfacing means which receives signals from, and dispatches signals to, the telecommunications system. A second interfacing means receives signals from, and despatches signals to, the microprocessor. A memory is provided, together with arbitration means arranged to control the first and second interfacing means so that only one interfacing means at a time has access to the memory. Decoding means is adapted to respond to address signals presented to the second interfacing means by the microprocessor, to generate signals enabling areas of the telecommunications system to be accessed.

2 Claims, 10 Drawing Sheets

MICROPROCESSOR INTERFACE DEVICE FOR USE IN A TELECOMMUNICATIONS SYSTEM

FIELD OF INVENTION

The invention relates to a microprocessor interface device for use in a telecommunications system. The device provides a 32 byte two-port processor interface which acts as a two-port buffer.

An aim of the present invention is to provide a microprocessor interface device for use in a telecommunications system.

SUMMARY OF THE INVENTION

According to the present invention there is provided a microprocessor interface device, for use in a telecommunications system including a microprocessor, wherein the device includes a first interfacing means for receiving signals from and dispatching signals to, the telecommunications system, a second interfacing means for receiving signals from, and dispatching signals to the microprocessor, a memory, arbitration means arranged to control the first and second interfacing means so that only one interfacing means at a time has access to the memory, and, decoding means adapted to be responsive to address signals presented to the second interfacing means by the microprocessor, and to generate signals enabling areas of the telecommunications system to be accessed.

STATEMENT OF THE OBJECTS OF THE INVENTION

An object of the present invention is to provide a microprocessor interface device wherein the first interfacing means includes a buffer for receiving a clock signal which is passed to a delay circuit arranged to delay the clock signal and generate under control of the arbitration means, an acknowledgement signal which is used to indicate that a system bus has been granted access to the memory.

A further object of the present invention is to provide a microprocessor interface device wherein the second interfacing means includes circuitry for generating a signal indicating to the microprocessor that access to the memory has been granted in response to a memory request signal generated by the microprocessor, and circuitry for generating a signal to enable the memory area so that the memory can be accessed.

BRIEF DESCRIPTION OF DRAWINGS

An embodiment of the present invention will now be described with reference to the accompanying drawings; wherein.

DESCRIPTION OF THE PREFERRED EMBODIMENT

Figure 1:
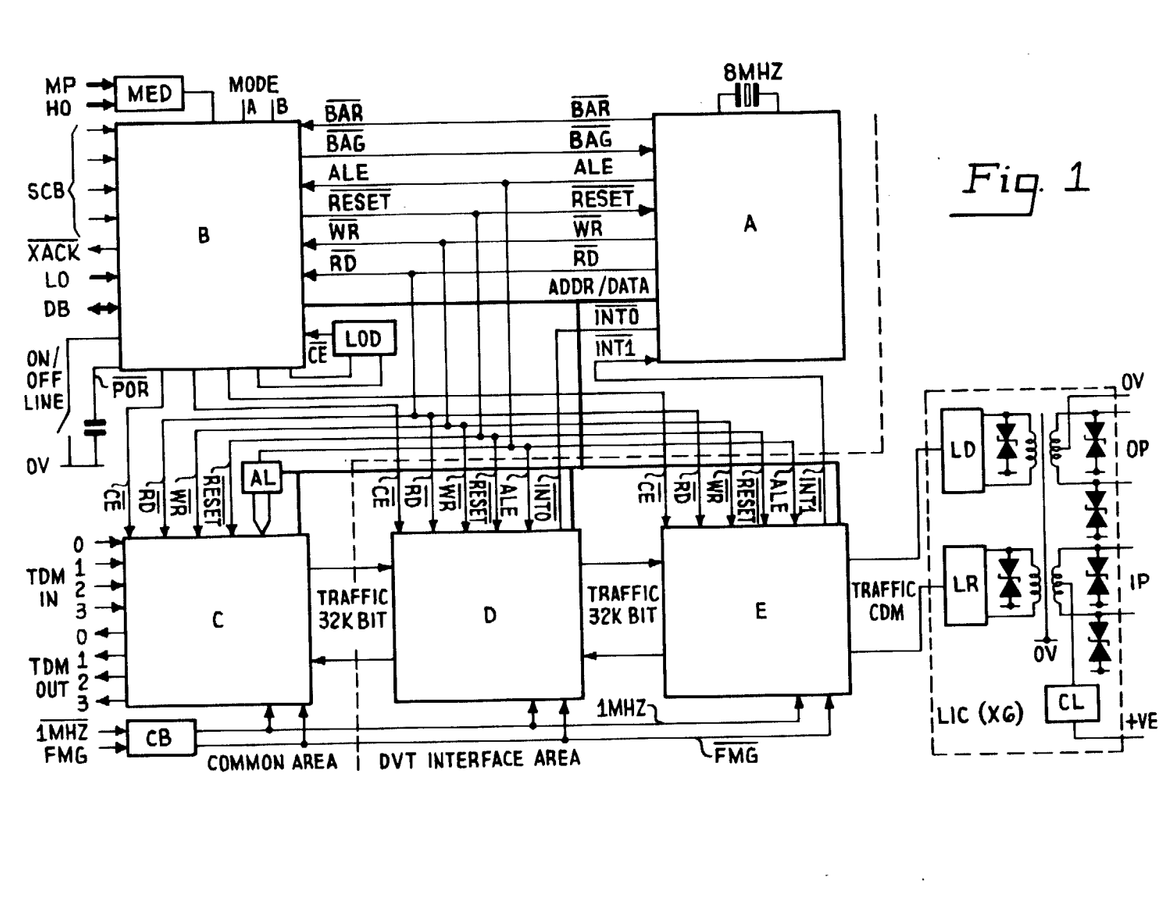
FIG. 1 shows a block diagram of part of a telecommunications system.

Referring to FIG. 1, the system block diagram shows a microprocessor A controlling a 32 byte two-port processor interface B, which is the subject of the present invention, a universal program bus selector C, a cyclically permutable code generator detector D; and a subscriber line interface modem E.

The microprocessor A communicates with the units B-E by way of the address/data bus ADDR/DATA. The microprocessor A generates control signal $\overline{\text{INTO}}$ for unit D, signals $\overline{\text{RD}}$, $\overline{\text{WR}}$, for units B-E, signal ALE for units B, D, E and unit AL, and request signal $\overline{\text{BAR}}$ for unit B. Unit B acts as a two-port buffer with arbitration between the self system bus and the microprocessor A. Unit B receives shelf control bus signals SCB and generates a transfer acknowledgement signal $\overline{\text{XACK}}$ and signal $\overline{\text{RESET}}$. A low order shelf address bus LO, and a high order shelf address bus HO is provided, the latter being connected to a module enable decoder MED, which is connected to a module position address bus MP. Mode A and B inputs are provided to selectively control the mode of operation of the unit. A data bus DB, feeds into and out of the unit B, unit B generates a decode signal $\overline{\text{CE}}$ for units C, D and E and a request granted signal $\overline{\text{BAG}}$ for the microprocessor A. A local decode circuit LOC generates a local decode signal $\overline{\text{CE}}$ for the unit.

The universal programmable bus selector C provides a common interface between six single channel digital traffic terminations operating at 32K bits per second. It receives TDM signals at 1M bit per second and transmits TDM signals out at 1M bit per second. The unit has an address latch input to which the address latch AL is connected.

The units A, B and C belong to a common area and the units D and E belong to a digital voice terminal interface area.

The cyclic permutable code generator detector D detects and generates cyclically permutable codewords on any of six independent channels and is controlled by a standard microprocessor interface. Eleven registers provide command and status information for full control. A codeword is detected if incoming serial data contains any eight bit word repeated six times consecutively. Generation of a codeword is by continuous serial transmission of a data byte loaded by the control interface. The unit D receives traffic from units C and E and transmits traffic to units C and E.

The subscriber line interface and modem E interfaces between the multiplexed traffic highways from unit D and six line interface circuits LIC forming the channel rate 4-wire digital voice terminal loops to the subscribers.

Each of the units C, D and E receive a framing and a 1 MHz clock signal from a clock buffer CB.

Each line interface circuit comprises trapezoidal line drivers LD, line receivers LR, and a current limiter CL. The subscriber line inputs are shown as IP and the outputs OP.

The microprocessor interface device will now be described in detail.

The device primarily acts as a 32×8 two-port buffer, with arbitration between the shelf system bus and the processor. Messages are passed to and from the device for control and signalling reporting. The device connects directly to the system bus with the addition of a comparator to provide the 'module enabled' signal transfer acknowledge $\overline{XACK}$. Signals are generated as appropriate on chip.

The device takes in the multiplexed address data bus of the host microprocessor for access to the two-port memory and for the address decoding section. In the simple host microprocessor mode the $\overline{BAR}/\overline{BAG}$ signals are used to request access by the microprocessor and 'permission granted' in reply.

In the case where the host processor is capable of being held in wait-states then the RDY signal is used to control host access, the use of $\overline{BAR}/\overline{BAG}$ being unnecessary.

The device provides two modes of address decoding for the microprocessor. This is used to eliminate extra decoders when driving hardware registers and/or other addressable devices.

The selection of mode is hand-wired by use of the input 'mode A, mode B' in accordance with the Truth Table below.

| A | B | Mode | | |
|---|---|---|---|---|
| 0 | 0 | Wait state-able host processor | | |
| 0 | 1 | EX RAM | | ⎫ |
| 1 | 0 | DECODE | TYPE 1 | ⎬ Simple host processor |
| 1 | 1 | DECODE | TYPE 2 | ⎭ |

External Memory

Eighteen general purpose connections act as address, data and control to an external Ram.

Decode Type 1

The connections act as chip select outputs for external devices.

Decode Type 2

Decoding from addresses is the same as Type 1. The connections act as chip selects for one external device. The other connections provide output enable and latch signals for read and write ports respectively.

Figure 2:
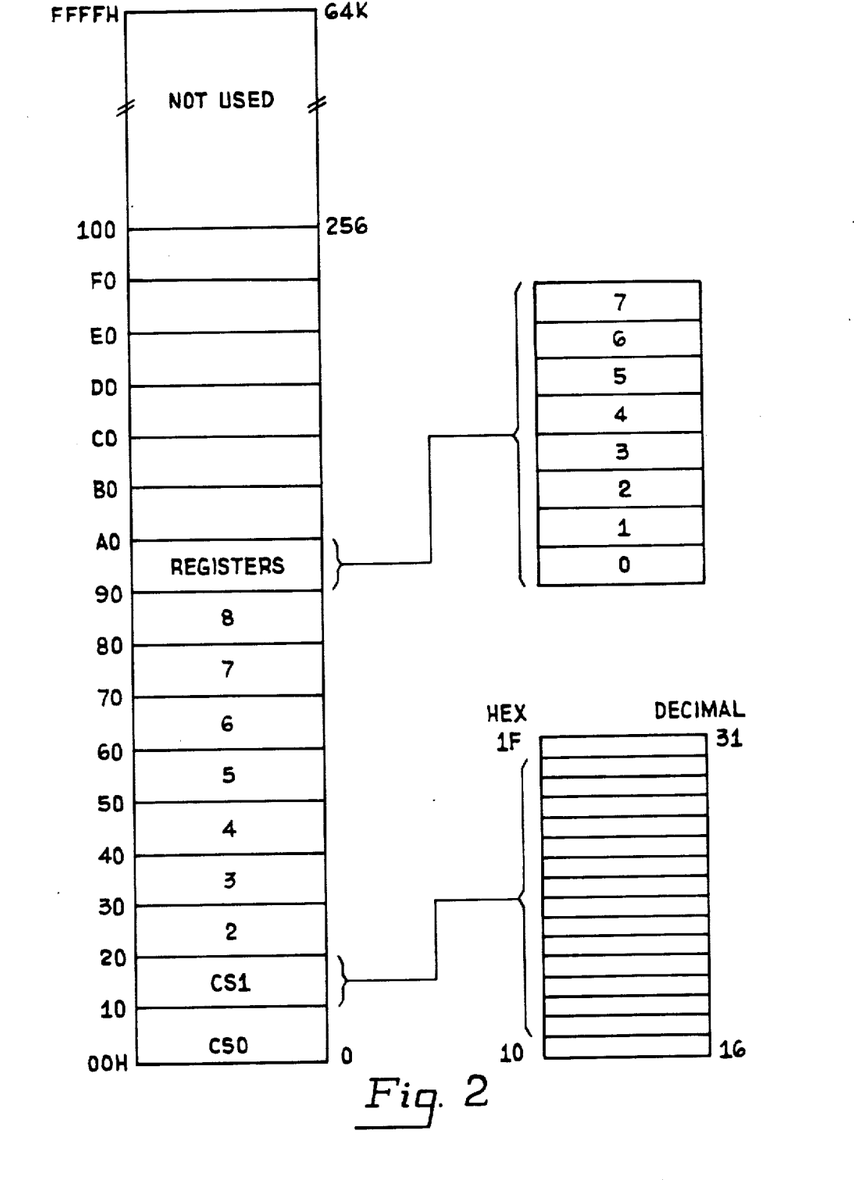
FIG. 2 shows a memory map of two-port decoder outputs.

Decode 1 gives use of CS0-8 and Reg 0-3, and decode 2 gives uses of CS0 and Reg 0-7 as shown in FIG. 2.

The two-port memory not shown, is enabled separately by host interface chip select signal CS. The CS signal may be derived from independant decoding allowing the two-port to be placed anywhere in the host memory space.

The device may be split into six functional areas.
a. System Bus Interface, SBI.
b. Host Bus Interface, HBI.
c. Arbitration circuits, ARB.
d. RAM and RAM decode, RAM, RAMDC.
e. Card Control Logic, CCL.
f. Decode circuit, DEC.

Figure 3:
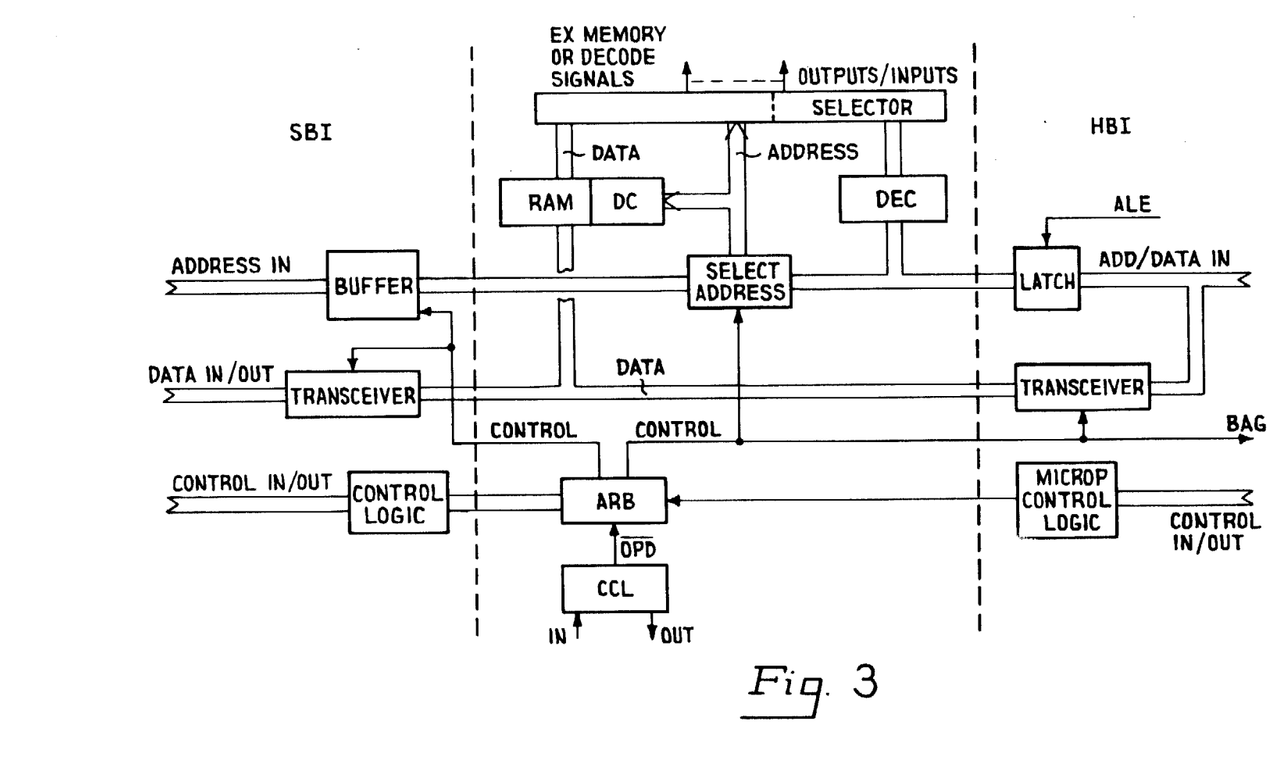
FIG. 3 shows a block diagram of a two-port gate array.

These areas are interconnected as shown in FIG. 3, to which reference should be made in conjunction with the following Figures.

System Bus Interface, SBI.

Figure 4:
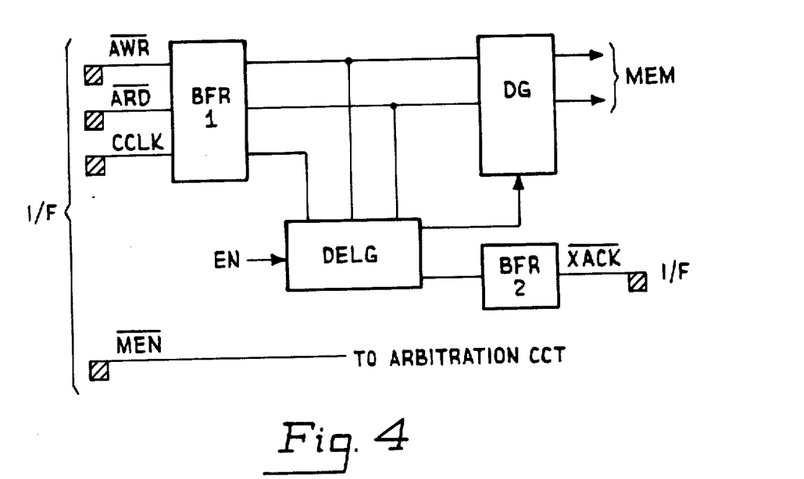
FIG. 4 shows a block diagram of a system bus interface.

This device area provides buffering and acknowledge signal generation for the system interface. The area has five external control signals, two of which go directly to the arbitration area. The byte wide address and data buses of the system bus are also buffered onto the chip to be selected as appropriate to the memory area.

The control signals are shown in FIG. 4. A buffer BFR1 receives the write, read and clock signals $\overline{AWR}$, $\overline{ARD}$ and CCLK respectively. The write and read signals are passed to control a memory by way of lines MEM and delay gating circuitry DG. The circuitry is enabled by signal EN from the arbitration circuit ARB. The delay generator DELG generates a transfer acknowledgement signal $\overline{XACK}$ for presentation to the system bus interface I/F by way of a buffer BFR2.

A module enable signal $\overline{MEN}$ is passed directly to the arbitration circuit ARB.

HOST BUS INTERFACE, HBI.

Figure 10:
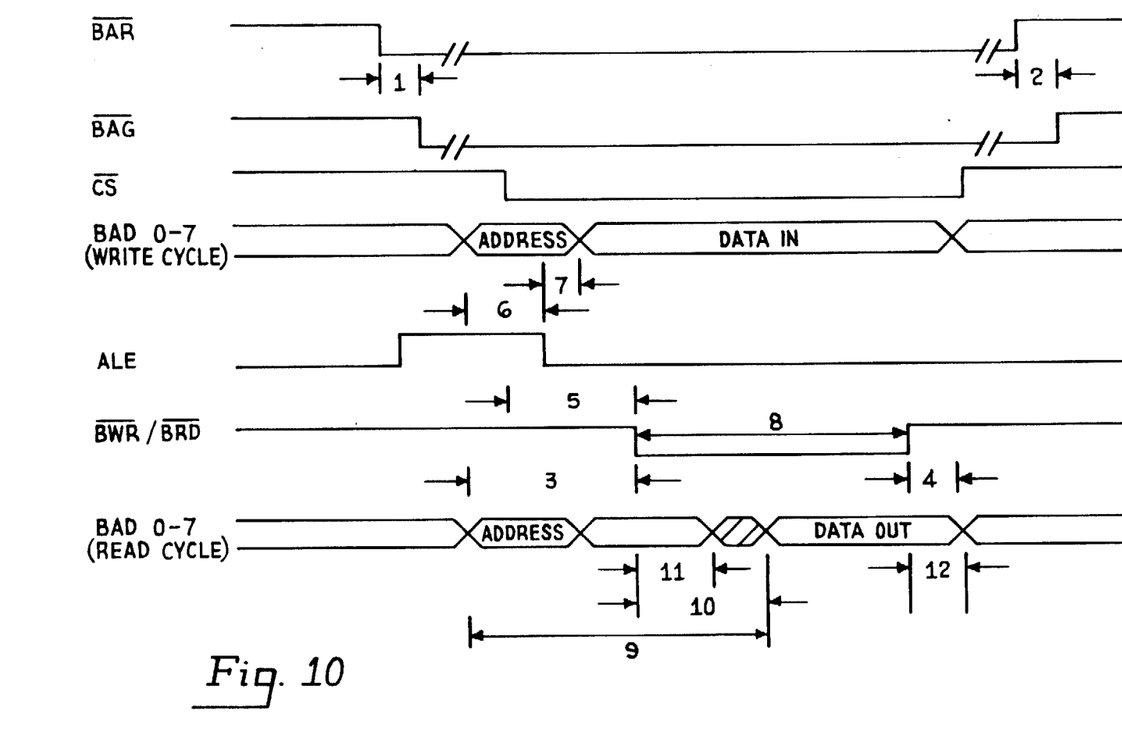
FIG. 10 shows waveforms for a host microprocessor.

In this mode memory access is granted by the signal denoted by signal $\overline{BAG}$ representing bus access granted as shown in FIG. 10. The $\overline{BAR}$ signal indicates that the memory is required and is passed to the arbitration circuit ARB. The signal $\overline{BAG}$ occurs as soon as the memory access is granted. This signal is polled by the software in the microprocessor before accessing the memory.

The chip select signal $\overline{CS}$ is used to signal the memory access.

Figure 5:
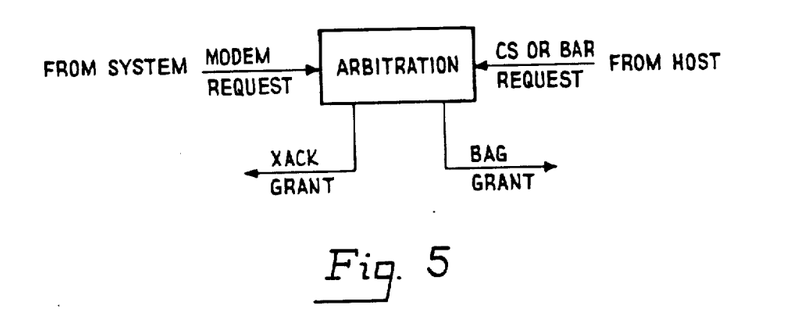
FIG. 5 shows the signals used by and generated by an arbitration circuit.

Arbitration Circuits, ARB. FIG. 5.

The arbitration area of the device ensures that only one of the two bus interfaces has access to the RAM area at any time. The circuit locks-out a port when the other is using the RAM.

The circuit has two signals between itself and each of the bus interface areas, one input and one output. The input signals acts as a request for access to the RAM. The output acts as a grant signal.

If one of the interfaces raises a request whilst the memory is busy, the arbitration circuit does not give a grant signal. The devices connected to each interface must inspect the grant line after requesting access, and only access the memory if a grant is given. The simple host microprocessor does this with signals $\overline{BAR}$ and $\overline{BAG}$.

Figure 6:
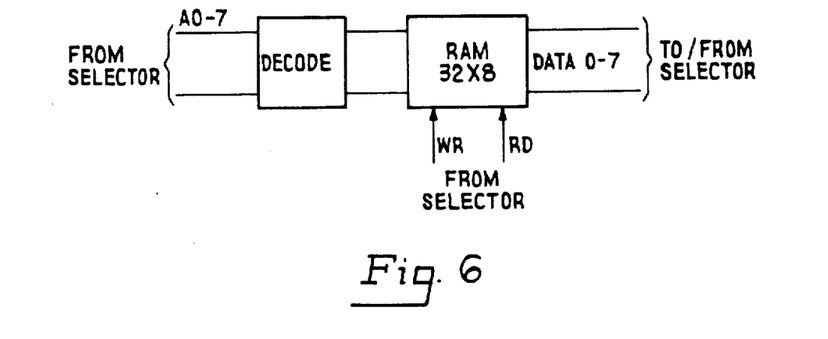
FIG. 6 shows a random access memory and associated memory decode.

RAM and RAM Decode Areas, RAM, RAMDC. FIG. 6.

The internal memory is organised as a 32 by 8 bit array. The memory is enabled when the mode 'A' input is '1' otherwise an external memory chip is used.

The RAM area is enabled as soon as a memory access is sensed. This is signified for the system and host interfaces by the $\overline{MEN}$ signal active or the $\overline{CS}$ signal active respectively.

Card Control Logic, CCL.

This area of the device performs the miscellaneous gating required for card reset and 'offline' functions as required. The logic provides an output 'reset' which responds to either a low on the power on reset $\overline{POR}$ input or the coincidence of $\overline{AWR}$, $\overline{MEN}$ and software Reset $\overline{SWR}$. The $\overline{POR}$ input is driven by a capacitor-resistor network. The 'module offline' signal $\overline{OPD}$ is gated into the arbitration logic to allow the system bus interface outputs to be forced to a tristate condition.

Figure 7:
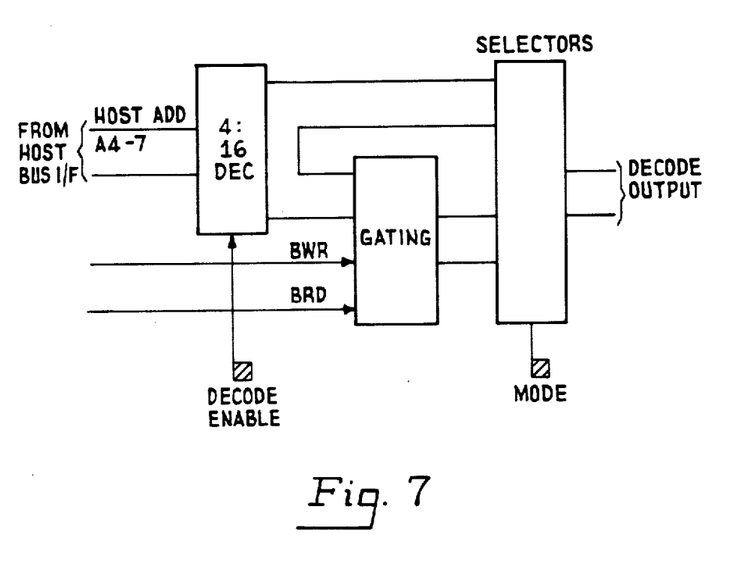
FIG. 7 shows decode circuitry.

Decode Circuit, DEC. FIG. 7.

The Decode area of the devices responds to the latched address of the host interface HBI. The decode circuit takes the high nibble of the address A4-7 and decodes to sixteen outputs. The sixteen outputs are then either presented directly to the outputs or further decoded with the address A0-3 and gated with the interface 'write and read' controls ($\overline{BWR}$, $\overline{BRD}$). The former method provides chip select outputs for 'memory like' sixteen byte long peripherals, such as the universal program bus selector.

The latter method, gating with write and read, allows direct connection of single byte registers, such as an output latch and an input buffer with output enable. Hence, the interface device decode outputs are taken directly to the latch and output enable connections of the peripheral devices respectively.

A decode enable signal enables the decoder outputs when it is 'zero'. The signal may be driven by external high-order decoding in order to place the decoder of the interface device more specifically in the host memory space.

INTERFACES.

Functional Pin Descriptions.

Bus A Interface.

Address Inputs $\overline{AA0\text{-}7}$.

Active low.

These signals provide the byte addresses from the two port RAM. They connect directly to the system bus address lines.

Data Inputs/Outputs $\overline{AD0\text{-}7}$.

These signals provide the parallel bidirectional connection to the shelf bus. Data is driven from the outputs when a shelf read cycle occurs.

Write Input $\overline{AWR}$, Read Input $\overline{ARD}$.

Active low.

The signals indicate to the device when a write and read cycle is occurring on the system bus.

Module Enabled Input $\overline{MEN}$.

Active low.

This signal indicates to the device that a system bus access is going to occur. The input is derived from an external decode of the higher system bus address bits.

Constant Clock Input $\overline{CCLK}$.

Active low.

This signal provides the acknowledge of circuitry timing reference and is a buffered version of the system bus signal $\overline{CCLK}$.

Transfer Acknowledge Output $\overline{XACK}$.

Active low. Tristate.

This signal is generated after the system bus has been granted access to the memory area. The signal is delayed by seven periods of signal $\overline{CCLK}$ to allow for the memory access time. The signal drives the system bus $\overline{XACK}$ signal directly.

Bus B Interface.

This interface is similar to bus A in function.

Address/Data Bus Bidirectional BAD 0-7.

Active high. Tristate.

This bus connects the device to the multiplexed address and data bus of the microprocessor. The addresses are latched within the device is response to signal ALE.

Address Latch Enable Input ALE.

Active high.

On the negative edge of this signal the address of the current cycle is stored.

Write Input $\overline{BWR}$ and Read Input $\overline{BRD}$.

Active low.

These signals indicate to the device when a write or read cycle is occuring from the microprocessor.

Chip Select.

Active low.

This signal, when active, enables the two-port memory section of the two-port processor. The input is asserted by the microprocessor decode logic in response to an address.

Bus Access Request $\overline{BAR}$.

Active low.

The $\overline{BAR}$ signal is used to inform the two-port section that the microprocessor wishes to gain access to the two-port memory (modes 01, 10 and 11 only).

Bus Access Grant $\overline{BAG}$.

This signal becomes active when the two-port arbitration logic allows access to the memory. The signal is polled by the microprocessor to determine when to access the bus. This signal is also used as direction control for external memory address.

External Memory Interface.

This interface provides address, data, write and read controls. These signals may be used to extend the internal 32×8 memory upwards.

The interface shares the same group of outputs as the decoder outputs. The state of MODE inputs determines which role the outputs adopt.

External Memory Address $\overline{EMA}$ 0-7.

Active low.

These signals form the pre-selected low order address for the external memory.

External Memory Data $\overline{EMD}$ 0-7.

Active low. Tristate.

These signals form the pre-selected data bus for the external memory.

External Memory Read Control $\overline{ERD}$.

Active low.

This signal drives the output enable pin of the external memory. The signal is pre-selected from the Read signals of the A and B ports.

External Memory Write Control $\overline{EWR}$.

Active low.

This signal drives the write input of the external memory and is pre-selected from the write signals of the A and B ports.

Decoder Outputs.

These signals replace the external memory interface when MODE A=1. The decoder outputs themselves split into two types depending on the state of the MODE B signal.

Card Control and Mode Inputs.

Mode A and B Inputs MA, MB.

Active high.

These signals set the operational modes of the devices. The inputs have internal pullups and require only links to OV to program the device.

Module Output Disable $\overline{OPD}$ Input.

Active low.

This signal when low, disables Port A outputs.

Power On Reset $\overline{POR}$ Input.

Active low.

This signal directly influences the RESET output. The input is connected to an external capacitor to ground.

Software Reset $\overline{SWR}$ Input.

Active low.

This signal is taken from all of the system bus. When $\overline{SWR}$, $\overline{AWR}$ and $\overline{MEN}$ are all active the $\overline{RES}$ output is active. The $\overline{SWR}$ input may be driven by external address decoding.

Reset $\overline{RES}$ Output.

Active low.

This signal is used to drive the reset of the microprocessor and miscellaneous reset and clear signals.

Interface Timings.

The timings for the device interfaces are shown in FIGS. 8–12.

RAM minimum specification is as follows:

|  | (nS) |
| --- | --- |
| Write | |
| Address to write active. | 70 |
| Address to write strobe edge. | 380 |
| Data set up time to write strobe edge. | 340 |
| Data hold time from write strobe edge. | 30 |
| Address hold time from write strobe edge. | 30 |
| Write pulse width required. | 165 |
| Read | |
| Address to data out. | 200 |
| Read to data out. | 400 |
| Data Tristate after Read | 40 |

Figure 8:
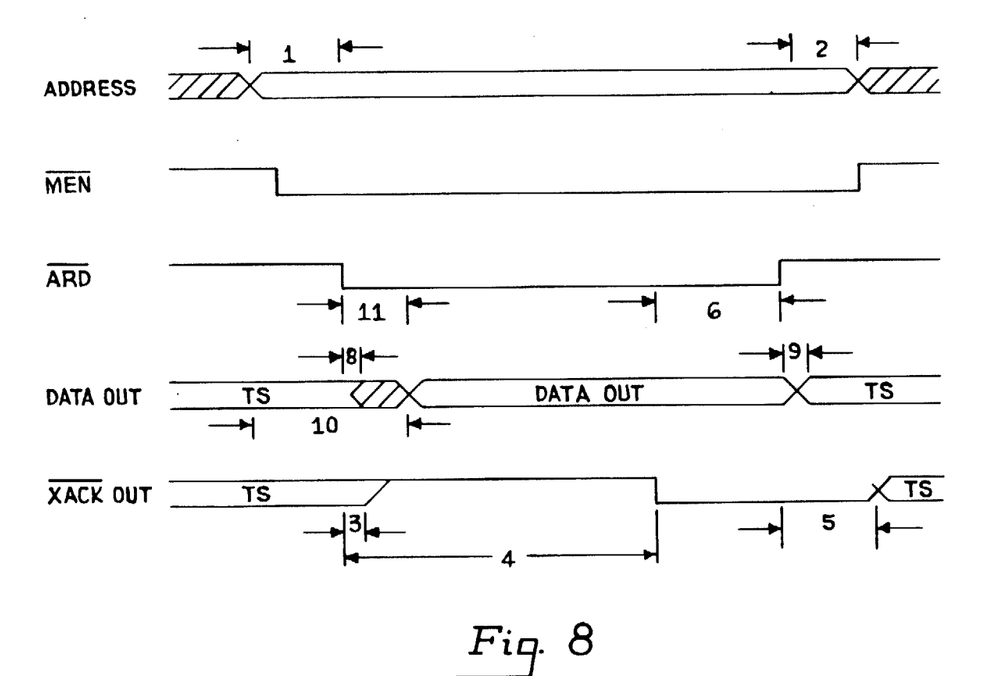
FIG. 8 shows waveforms for a system interface read cycle.
Figure 9:
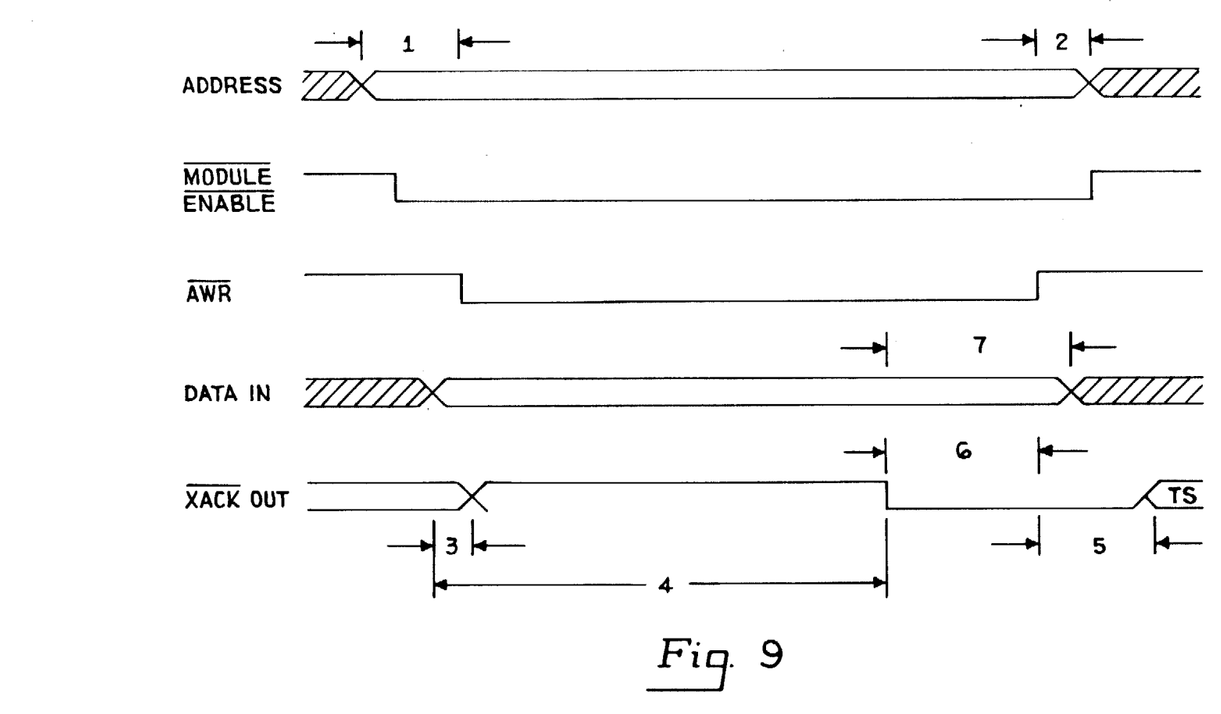
FIG. 9 shows waveforms for a system interface write cycle.

System Interface FIGS. 8 and 9.
General.

|  | Min nS | Max nS |
| --- | --- | --- |
| 1. Required module enable/address/data to command set up time. | 0 | — |
| 2. Required module enable/address/data to command hold time. | 0 | — |
| 3. Command active to Xack driving. | 0 | 60 |
| 4. Command active to Xack active. | 600 | 845 |
| 5. Command inactive to Xack Tristate. | 0 | 55 |
| 6. Required command hold after Xack active. | 0 | — |
| Write | | |
| 7. Required data hold after Xack active. | 70 | — |
| Read | | |
| 8. Read active to A data drive. | 0 | 45 |
| 9. Read inactive to A data tristate. | 0 | 75 |
| 10. Address valid to valid data out. |  | 395 |
| 11. Read active to valid data out. |  | 345 |

Host I/F Microprocessor. FIG. 10.
General.

|  |  |  |
| --- | --- | --- |
| 1. $\overline{BAR}$ to $\overline{BAG}$ low. | 0 | 75 |
| 2. $\overline{BAR}$ to $\overline{BAG}$ high. | 0 | 65 |
| 3. Required address to command set up. | 140 | — |
| 4. Required address/data to command hold time. | 70 | — |
| 5. Chip select address/data to command set up. | 35 | — |
|  | Min nS | Max nS |
| 6. Required address to ALE negative edge set up. | 40 | — |
| 7. Required address to ALE negative edge hold time. | 10 | — |
| Write | | |
| 8. Required write pulse width Data set up time before write positive edge. | 145 | — |
| Read. | | |
| 9. Address to data valid. |  | 390 |
| 10. Read to data valid. |  | 250 |
| 11. Read to data driving. |  | 75 |
| 12. Read to data Tristate. | 0 | 75 |

Figure 11:
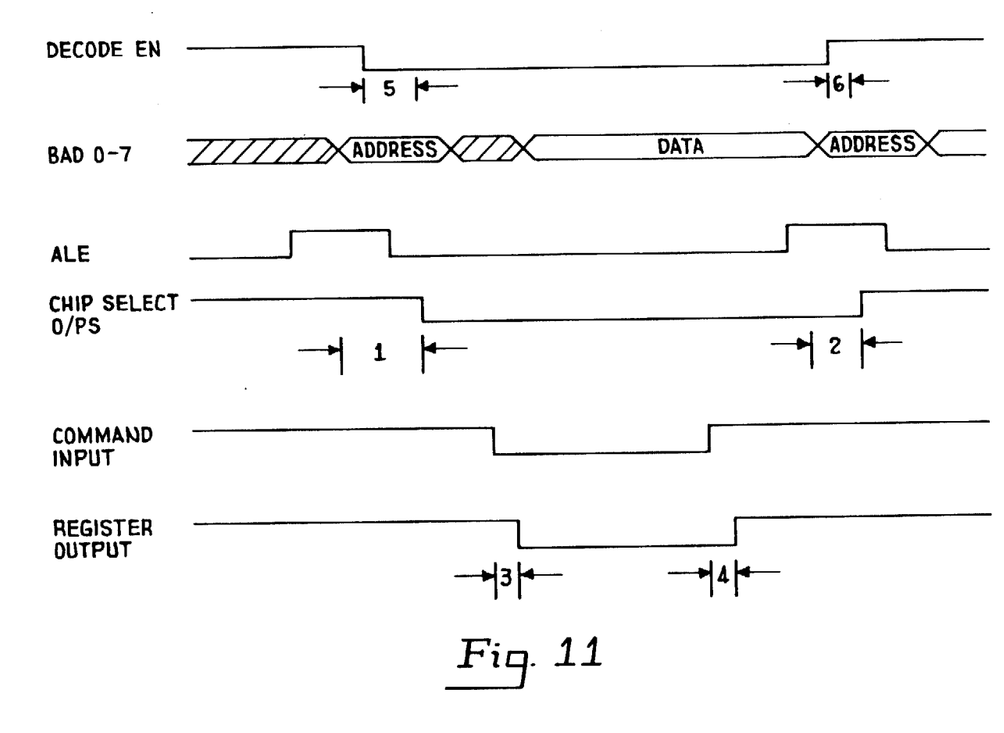
FIG. 11 shows a decode output timing waveforms; and, FIG. 12 shows control timing waveforms.

Decode Outputs. FIG. 11.

| 1. Address to chipsel active. | — | 150 |
| --- | --- | --- |
| 2. New address to chipsel inactive. | — | 120 |
| 3. Command active to reg O/P active. | — | 130 |
| 4. Command inactive to reg O/P inactive. | — | 110 |
| 5. $\overline{\text{DECODE EN}}$ to chipsel active. | — | 140 |
| 6. $\overline{\text{DECODE EN}}$ to chipsel inactive. | — | 100 |

Figure 12:
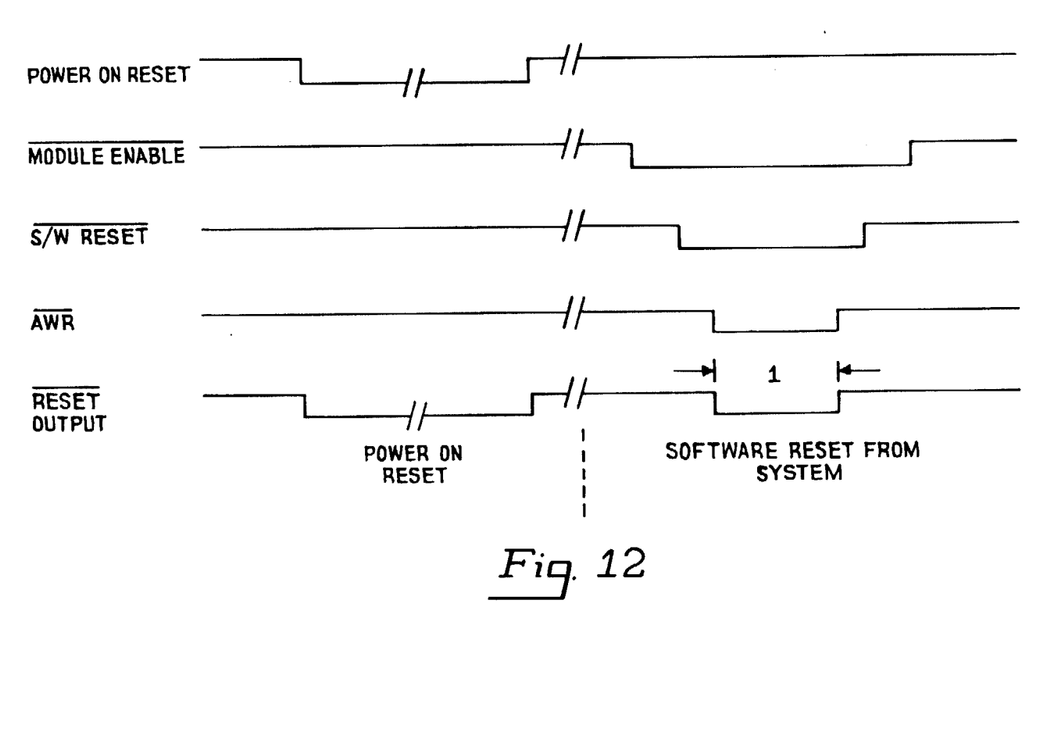

Card Control Logic. FIG. 12.

| 1. Reset output active time. | 2 | Depends on POR capacitor |
| --- | --- | --- |

What I claim is:

1. A microprocessor interface device, for use in a telecommunications system including a microprocessor, wherein the interface device comprises:
   a first interfacing means for receiving signals from, and dispatching signals to the telecommunications system,
   a second interfacing means for receiving signals from, and dispatching signals to the microprocessor,
   a memory,
   arbitration means including a lock-out circuit arranged to control the first and second interfacing means so that only one interfacing means has access to the memory, while the other interfacing means is locked-out by the lock-out circuit and,
   decoding means including selector circuits which receive address signals presented to the second interfacing means by the microprocessor, and generates signals which operate the selector circuits to access other equipment in the telecommunications system,
   the first interfacing means includes:
   a first buffer, arranged to receive clock, read and write signals,
   a delay generator, arranged to be controlled by the first buffer, and enabled by a signal generated by the arbitration means, and, a second buffer arranged to receive and store a signal produced by the delay generator, said second buffer being arranged to generate an output signal which is used to indicate that a system bus has been granted access to the memory.

2. A microprocessor interface device as claimed in claims 1, wherein the second interfacing means includes circuitry for generating a signal indicating to the microprocessor that access to the memory has been granted in response to a memory access request signal generated by the microprocessor, and circuitry for generating a signal to enable the memory so that the memory can be accessed.

* * * * *